United States Patent Office 2,965,540
Patented Dec. 20, 1960

2,965,540
INHIBITING THE GROWTH OF PLANT VIRUSES

Walter A. Darlington, Dayton, Ohio, assignor to Monsanto Chemical Company, St. Louis, Mo., a corporation of Delaware No Drawing. Filed Nov. 3, 1958, Ser. No. 771,224

5 Claims. (Cl. 167—33)

The invention relates to the inhibition of the growth of viruses which attack plants, and more particularly to chemotherapy as applied to the control of plant viruses.

Viruses have been defined as submicroscopic entities capable of being introduced into specific living cells and reproducing inside such cells only. This definition summarizes the chief characteristic of viruses—small size, infectivity, host specificity, and complete dependence on the integrity of the host cell. The intimate relationship between the virus and the host cell is the most distinguishing feature of the virus, and necessitates a more subtle approach to the chemotherapy of viruses than to that of other infectious agents, such as bacteria and fungi.

Viruses have long plagued mankind, but their existence was recognized first in 1892. It is now known that viruses afflict plants, insects, bacteria and animals, and seem to be increasing in importance. This invention is of course, limited to the treatment of virus diseases of plants.

There seems no doubt that plant virus diseases are more important now than they were even a decade ago, though the reasons for this are far from clear. Some of this increase is no doubt due to the introduction of viruses from one country to another in imported bulbs, tubers and plants. It is a difficult matter to prevent the entry of viruses by quarantine regulations, especially when no one, including the exporter, may be aware of the existence of the virus in question. The virus of tomato spotted wilt is a good example of this. It was first described in Australia in 1915; about 15 years later it was identified at Cambridge, England in an ornamental plant found in a Cardiff nursery. At the present time, its distribution is practically world-wide, having been passed easily from country to country in dahlia tubers and other vegative organs of plants.

Although no intelligent estimate of the damages caused by plant viruses can be made, the problem is now being recognized as serious. Virus diseases are a serious problem in the farming of sugar beet, sugar cane, tomato, bean, cocoa, orange, tobacco, potato, peach, strawberry, raspberry, broccoli, cabbage, hops and many flowers. In severe cases, e.g. with peach and sugar beet, virus diseases may force abandonment of large areas for the cultivation of crops. In less severe cases, a virus disease may result in a decrease in yield and quality. It has been estimated that tobacco mosaic virus causes an annual loss of 40 million pounds of tobacco in the United States of America alone.

The great trade in seed potatoes amounting to half a million tons a year between England, Scotland and Ireland is based entirely on the prevalence of potato viruses and their aphis vectors in England. One potato virus alone, the ubiquitous potato virus X which in the United States used to be called the "healthy potato virus," is responsible for a loss of ten percent of the world's potato crop, while the losses of potatoes in Britain, due to virus infection, have been put at one million tons per year. The grower of sugar-beets, especially in East Anglia, is only too familiar with "virus yellows" which, in an early season infection, may reduce sugar content by 50%.

The situation as regards the cabbage and broccoli crop becomes yearly more serious. There are two aphis-borne viruses which attack those plants causing them to be dwarfed and crinkled and prevent the formation of heart or curd.

Of flowering plants, possibly dahlias are the most seriously affected by viruses and, being propagated by tubers, the situation resembles in many ways the disastrous one which results from growing potatoes in England from home-saved "seed."

In the United States, in addition to most of the viruses found in England there are several other important diseases such as curly-top of sugar beets and yellows of asters. Both the viruses causing these diseases have a wide host range and give rise to serious infections in many other crops.

In tropical regions there are many important virus diseases such as swollen-shoot of cocoa, phloem-necrosis of tea, rosette of ground-nuts and many others. A serious situation has arisen in the clove industry in Zanzibar where the clove trees have been dying in large numbers. The disease which causes the sudden collapse of vigorous trees has been called the sudden death disease and by a process of elimination of all other possible causes is now considered to be due to a virus.

Of all these tropical virus diseases, however, by far the most serious is "swollen shoot" of the cocoa tree. In the Gold Coast this virus disease probably started about 1920, although it was not till 1936 that reports were received of the "dying back" of large numbers of trees. At first there seemed to be only a few acres affected, but soon reports were received from many areas that the disease was spreading, and 10,000 trees were known to be dying. Up to 1939, trees were dying at the rate of one million a year. The annual rate between 1939 and 1945 was five million and between 1945 and 1948 it rose to fifteen million. It is clear that the cocoa industry will not long be able to survive losses on that scale.

Although the losses to viruses are impressive, few control measures have been developed. Of the curative measures investigated, selected inactivation of a virus by the application of heat is generally not practical, and chemotherapy has been used very little. Control of insect-transmitted virus diseases by control of the insect vectors, although attractive, has not been too successful.

Other control measures of a negative nature are: destruction of infected plants (roguing); isolation from sources of infection; eradication of alternate hosts; use of healthy planting material; and use of disease-resistant varieties. Although these practices are adequate in certain cases, none is generally applicable and all have definite limitations.

It is an object of this invention to provide a chemical method of treating plants to inhibit the growth of viruses in the plants.

It is another object of this invention to provide a chemical method of treating tobacco plants to inhibit the growth of tobacco mosaic virus therein.

It is a further object of this invention to provide a chemical method of treating field pinto beans to inhibit the growth of tobacco ringspot virus therein.

These and other objects of the invention will become apparent as the detailed description of the invention proceeds.

The inventive method of inhibiting the growth of viruses in plants, involves treating the plants with at least a sufficient amount of a chemical compound to inhibit the growth of the viruses. Chemical compounds which we have discovered to inhibit the growth of viruses in plants are 2 - hydrocarbyl - 1,4,5,6 - tetrahydropyrimidine compounds of the formula

wherein R is an unsaturated aliphatic hydrocarbon radical having from 2 to 22 carbon atoms, and R' is hydrogen or the methyl radical but at least one R' is hydrogen. Compounds where one or two of the (R')'s are other lower alkyl radicals than methyl will also have anti-viral activity. The salts of these compounds are also active, e.g. the hydrochloride, the nitrate, the sulfate, the dodecylbenzenesulfonic acid, the maleate, the fumarate salts, etc. However, in effect treating the plants with a salt of an active compound is treating the plant with the compound itself, since the salt upon contact with water releases the compound which is the active anti-virus agent. Of this class of active anti-virus chemicals, the preferred compounds are those wherein R is a long-chain aliphatic unsaturated hydrocarbyl group containing from 7 to 22 carbon atoms. Especially active are anti-viral agents which are mixtures of 2-(8-heptadecenyl)-1,4,5,6-tetrahydropyrimidine and 2-(8,11-heptadecadienyl) - 1,4,5,6 - tetrahydropyrimidine made from the unsaturated fatty acid fraction from tall oil distillation, which normally consists primarily of about equal portions of oleic and linoleic acids, and mixtures in which one or two of the hydrogens in the 4, 5 or 6 position of either or both compounds of the mixture are replaced by methyl radicals will also be very active. However, other sources of these acids can be used, and either component can be present in the mixture in from 5% to 95% by weight and very good anti-viral compositions will be obtained. These mixtures can then be diluted with inert liquid or solid carriers to concentrations as low as about 2 parts per million (p.p.m.) or possibly lower and still be effective. The particular concentration used may vary depending on the activity of the particular antiviral agents. Normally these agents will be effective in concentrations in the range of about $10^{-3}$ to about $10^{-5}$ molar concentrations, but higher concentrations will normally be used with the concentration being maintained below the level which will cause substantial phytotoxic injury to plants. Also those compounds having lower unsaturated aliphatic hydrocarbyl groups are active anti-virus chemicals having a lower degree of activity than those compounds containing the larger number of carbon atoms in the hydrocarbyl groups.

The growth-inhibiting chemical can be applied to the plants in a number of different ways, but it is preferred to apply it by spraying the plant foliage with a water solution or suspension of the chemical in at least a sufficient concentratin to inhibit virus growth in the plant. The chemical compound can be applied to the plant by spraying, dipping in the case of potted plants, dusting with the chemical dispersed in an inert powder, or by other conventional means, and the chemical can even be applied indirectly to the plant by treating the soil whereby the chemical is absorbed by the plant through its root system. An additional method of applying would be by suspending small particles of the chemical in a stream of air or other gas, and spraying the plant with this suspension. The chemical can even be sprinkled on the plants in undiluted or powder form, if desired. In any event the invention does not lie in the particular method of treating the plant. If the chemical is applied in diluted form as will usually be desirable, it will be applied in as concentrated a solution as is readily handleable and which will not cause substantial phytotoxic damage to the plants being treated.

If the chemical is applied in water diluent and is soluble in water, of course, no dispersant will be necessary, although a wetting agent may still be desirable for maximum effectiveness. If the chemical is not very soluble in water, an emulsifying agent may be required to keep it dispersed such as, e.g., alkylbenzenesulfonates, polyalkylene glycols, salts of sulfated long-chain alcohols, sorbitan fatty acid esters, etc., and other emulsifying agents which can be used are listed, e.g., in the U.S. Department of Agriculture Bulletin No. E607. The active chemicals of the invention can also be applied, dissolved or dispersed in organic solvents, e.g., liquid hydrocarbons, provided they are substantially non-phytotoxic to the plants. If applied admixed with an inert pulverulent carrier, such carriers as e.g., talc, bentonite, kieselguhr, diatomaceous earth, etc. can be used.

The following is a list of a number of the active chemical compounds of the invention. This list is given for the purpose of illustration only and is not meant to be limiting. For example, a list of the compounds having unsaturated aliphatic hydrocarbyl groups is as follows:

2 - vinyl - 1,4,5,6-tetrahydropyrimidine, 2-(1-propenyl)-1,4,5,6 - tetrahydropyrimidine, 2-allyl-1,4,5,6 - tetrahydropyrimidine, 2-(1-butenyl)-1,4,5,6-tetrahydropyrimidine, 2-(2-butenyl) - 1,4,5,6-tetrahydropyrimidine, 2 - isobutenyl-1,4,5,6-tetrahydropyrimidine, 2-(1-pentenyl)-1,4,5,6-tetrahydropyrimidine, 2-(2-methylbutenyl-1)-1,4,5,6 - tetrahydropyrimidine, 2-(3-methylbutenyl-1)-1,4,5,6-tetrahydropyrimidine, 2-(1-hexenyl)-1,4,5,6-tetrahydropyrimidine, 2-(1-heptenyl)-1,4,5,6-tetrahydropyrimidine, 2-(1-octenyl)-1,4,5,6-tetrahydropyrimidine, 2-(1-dodecenyl)-1,4,5,6-tetrahydropyrimidine, 2-(9-decenyl)-1,4,5,6 - tetrahydropyrimidine, 2-(8-heptadecenyl) - 1,4,5,6 - tetrahydropyrimidine, 2-(1,4-butyldienyl)-1,4,5,6-tetrahydropyrimidine, 2-(1,4-pentadienyl) - 1,4,5,6 - tetrahydropyrimidine, 2-(1,5-hexadienyl)-1,4,5,6-tetrahydropyrimidine, 2 - (8,11-heptadecadienyl) - 1,4,5,6 - tetrahydropyrimidine, 2 - ethynyl-1,4,5,6-tetrahydropyrimidine, 2-(1-propynyl)-1,4,5,6-tetrahydropyrimidine, 2-(2-propynyl)-1,4,5,6-tetrahydropyrimidine, 2-(1-pentynyl)-1,4,5,6-tetrahydropyrimidine, 2-(2-pentynyl)-1,4,5,6-tetrahydropyrimidine, 2-(3 - methylbutynyl-1)-1,4,5,6-tetrahydropyrimidine, 2-(1 - hexynyl)-1,4,5,6-tetrahydropyrimidine, 2-(2-hexynyl)-1,4,5,6-tetrahydropyrimidine, 2-(3-hexynyl)-1,4,5,6-tetrahydropyrimidine, 2-(3,3-dimethylbutynyl-1)-1,4,5,6-tetrahydropyrimidine, 2-(1-octadecenyl)-1,4,5,6-tetrahydropyrimidine, 2-allyl-4-methyl-1,4,5,6-tetrahydropyrimidine, 2 - (8 - heptadecenyl)-4-methyl-1,4,5,6-tetrahydropyrimidine, 2-(8,11-heptadecadienyl)-5-methyl-1,4,5,6 - tetrahydropyrimidine, 2-(8-heptadecenyl)-6-methyl - 1,4,5,6 - tetrahydropyrimidine, 2-(8,11-heptadecadienyl)-4,5-dimethyl-1,4,5,6-tetrahydropyrimidine, 2-(8-heptadecenyl)-5,6-dimethyl-1,4,5,6-tetrahydropyrimidine, 2-(8,11-heptadecadienyl) - 4,6-dimethyl-1,4,5,6-tetrahydropyrimidine, etc.

It will be noted that of the long-chain hydrocarbyl groups only the normal groups are specified. This was done so as to not unnecessarily lengthen this application. It is also intended to cover these branched chain higher aliphatic hydrocarbon groups, since obviously these compounds will also be active anti-viral agents.

Salts of the compounds of the invention are also active and anti-viral agents, but the active portion is the compound itself and not the salt portion. The pyrimidine salts of the invention on contact with water hydrolyze releasing the pyrimidine compound which is the active constituent. The salt in some cases can have the advantage of getting the substituted pyrimidine compound into the plants more efficiently and so promoting the anti-virus action. This can be particularly true of some of the organic salts such as one which will be mentioned illustratively below, since the organic salts will tend to hydrolyze more slowly than the inorganic salts mentioned. The following is a non-limiting list of the active salts of the invention:

2-allyl-1,4,5,6-tetrahydropyrimidine hydrochloride, 2-vinyl-1,4,5,6-tetrahydropyrimidine.nitrate, 2 - (8 - heptadecenyl)-1,4,5,6-tetrahydropyrimidine.sulfate, 2 - (8-heptadecenyl) - 1,4,5,6-tetrahydropyrimidine.hydrochloride, 2 - (8,11-heptadecadienyl) - 1,4,5,6 - tetrahydropyrimidine.hydrochloride, a 50:50 mixture of 2-(8-heptacenyl/ 8,11 - heptadecadienyl) - 1,4,5,6 - tetrahydropyrimidine.hydrochlorides, 2 - ethynyl - 1,4,5,6 - tetrahydropyrimidine.hydrochloride, 2 - (8-heptadecenyl)-4-methyl-1,4,5, 6 - tetrahydropyrimidine.hydrochloride, 2 - (8,11 - heptadecadienyl) - 6 - methyl - 1,4,5,6 - tetrahydropyrimidine, dodecylbenzenesulfonate, 2 - (8 - heptadecenyl) - 4,5-dimethyl-1,4,5,6-tetrahydropyrimidine.maleate, etc.

The inhibition effect of the chemical on virus growth is illustrated as follows: In experiments run substantially according to the method of Commoner et al., Arc., Biochem., Biophys., 27, 271 (1950) tests were conducted showing the inhibiting effects of the following compounds or mixtures:

2-(2-heptadecyl)-1,4,5,6-tetrahydropyrimidine, 2 - (8-heptadecenyl) - 1,4,5,6 - tetrahydropyrimidine, 2 - (8,11-heptadecadienyl)-1,4,5,6-tetrahydropyrimidine, a 50:50 mixture of the 2-(8-heptadecenyl)-1,4,5,6-tetrahydropyrimidine and the 2-(8,11-heptadecadienyl)-1,4,5,6-tetrahydropyrimidine, and a mixture of 2-substituted 1,4,5,6-tetrahydropyrimidine prepared from the unsaturated fatty acids fraction from tall oil distillation having about 48% oleic acid and 46% linoleic acid.

The 2-substituted-1,4,5,6-tetrahydropyrimidines of the invention can be prepared by several known methods. One process comprises heating a carboxylic acid and 1,3-diaminopropane (or its hydrochloride salt) in the presence of a dehydration catalyst. In place of the carboxylic acid, the corresponding halides, anhydrides, amides, or esters can be used. Dehydration catalysts such as sulfuric acid and sulfonic acids, such as p-toluene sulfonic acid, are effective. These should be presented in an amount of about 0.001 and about 0.1 moles per mole of carboxylic acid. The diamine should be present in slight excess. Inert diluents, such as xylenes, can be employed. The reaction usually requires from 4 to 300 hours at temperatures between about 60° and 285° C., during which period the water of condensation is continuously removed.

The following is a description of a typical preparation:

*Preparation of 2-(8-heptadecenyl/8,11-heptadecadienyl)-1,4,5,6-tetrahydropyrimidine mixture*

One hundred and forty-one grams (0.5 mole) of mixed fatty acids were placed in a three-necked flask equipped with heating mantle, mechanical agitator, reflux condenser and thermometer. The fatty acids were derived from fractionation of tall oil, and were composed of about 2% rosin acids, 2% unsaponifiable material, 2% saturated fatty acids, 46% linoleic acid and 48% oleic acid. To the fatty acids was added 111 g. (1.5 moles) of 1,3-diaminopropane, a gelatinous material forming during the addition but complete solution resulting upon completion of the addition. The solution was heated under reflux at about 135° C. for twelve hours. Excess amine and water formed in the reaction were removed by distillation under atmospheric pressure to a liquid temperature of 245° C. and holding at this temperature for five hours. The residual product was distilled under diminished pressure. The fraction (73.5 g.) boiling 198 to 237° C. at 0.6 mm. was fractionated through an 8" Vigreaux column, the product (40 g.) being collected at 178–187° C. at 0.2 mm. Analysis showed that it contained 8.6% nitrogen (8.75% calculated).

In a similar manner to that described above a 2-(8-heptadecenyl/8,11 - heptadecadienyl) - 5 - methyl - 1,4,5,6-tetrahydropyrimidine mixture is prepared by reacting 2-methylpropane-1,3-diamine with the acid mixture. In a like manner 1,3-dimethylpropane-1,3-diamine used as the polyamine will produce the corresponding 2-(8-heptadecenyl/8,11 - heptadecadienyl) - 4,6 - dimethyl - 1,4,5,6-tetrahydropyrimidine mixture. If either 1-methylpropane - 1,3 - diamine or 1,2-dimethylpropane-1,3-diamine were reacted, it would be expected that a mixture of isomers would be produced.

Briefly the procedure involved inoculation of one leaf of healthy turkish tobacco plant with the virus and after 24 hours, contacts of portions of the inoculated leaf with the test compounds. Leaves were inoculated with Johnson tobacco virus by rubbing their entire surface with a gauze pad moistened with a phosphate buffer solution (pH 7.0) containing 200 μg. of the virus per milliliter. After inoculation the leaves were placed under a bell-jar with their petioles in water for 24 hours. At the end of this time, six 0.5" discs were punched from each leaf, weighed, washed in water and the discs of each leaf placed in different 3.5" Petri dishes each containing a different test chemical in the desired concentration for testing in 15 ml. of half-strength Vickery's solution (Vickery et al., Bull. Conn. Agr. Expt. Sta., 399 (1937)) which had been prepared to have a final concentration of $5 \times 10^{-3}$ mole of $KH_2PO_4$. A "control" was prepared for each leaf by placing another set of six discs from the leaf into a Petri dish containing 15 ml. of the same Vickery's solution but no test chemical. The dishes of discs were incubated for seven days under fluorescent light of 170 foot candles. At the end of that time the discs were removed and two groups of three were made up from each dish in order to provide "checks." The tobacco mosaic virus content of each group was determined as described by Commoner et al. (loc. cit.) except that the final washing step thereof was omitted because it had been previously observed by us that this step in the isolation procedure results in some loss of virus. The colorimetric measurements were made at 750 mu in a Coleman Universal Spectrophotometer and the amount of virus was read from a standard curve prepared with known amounts of tobacco mosaic virus.

The results of these tests employing this procedure testing the inhibition of virus growth are reported in Table I below.

TABLE I

*Inhibition of tobacco mosaic virus multiplication in leaf discs*

| Compound | Molar Concentration | Percent Inhibition |
|---|---|---|
| A. Tetrahydropyrimidine mixture from Tall Oil unsaturated fatty acids | $10^{-4}$ | 65 |
|  | $5 \times 10^{-5}$ | 27 |
| B. 2-(8-Heptadecenyl)-1,4,5,6-tetrahydropyrimidine | $10^{-3}$ | 100 |
|  | $10^{-4}$ | 73 |
|  | $5 \times 10^{-5}$ | 30 |
| C. 2-(8,11-Heptadecadienyl)-1,4,5,6-tetrahydropyrimidine | $10^{-3}$ | 95 |
|  | $10^{-4}$ | 34 |
|  | $5 \times 10^{-5}$ | 12 |
| D. Mixture of B and C | $5 \times 10^{-5}$ of each | 61 |
|  | $2.5 \times 10^{-5}$ of each | 26 |
| E. 2-Heptadecyl-1,4,5,6-tetrahydropyrimidine | $10^{-3}$ | 0 |
|  | $10^{-4}$ | 0 |

Since inoculation of the leaf precedes the treatment by 18–20 hours, this test is a measure of the ability of a compound to inhibit tobacco mosaic virus (TMV) multiplication after the virus has become established in the host tissue.

The results, reported in Table I, show that the tetrahydropyrimidine mixture prepared from tall oil unsaturated fatty acids is effective to inhibit TMV multiplication. To determine if the anti-viral activity was a property of both of the major constituents of the mixture, the two compounds were synthesized, separately, then tested individually and in combination. The results show that although both have anti-viral activity, greater inhibitions were obtained with the 8-heptadecenyl than with the 8,11-heptadecadienyl derivative.

The heptadecyl derivative had no activity even when tested at $10^{-3}$ M concentration. Thus, it appears that unsaturation in the side chain is essential for anti-viral activity.

The data also suggest a synergism with the mixture, since the observed effect (61% inhibition) is greater than the sum of the activities of the separate components of the mixture (42% inhibition). The mechanical mixture is also equal in inhibiting effect to the mixture obtained from the tall oil unsaturated fatty acids.

All but one (the inactive one) of these same compounds were also subjected to additional testing on whole plants and the decrease in local lesions observed on those plants treated with the chemical as compared to control of plants which had no chemical treatment. The host plants used in testing the inhibition of tobacco mosaic virus (TMV) were tobacco plants (*Nicotiana glutinosa*), and the host plants used in testing the inhibition of tobacco ringspot virus (TRV) were field pinto beans. A typical test is described in the following paragraph; however, a number of variations on this method have been tried such as, varying the time interval between inoculation and treatment, chemical treatment preceding inoculation, etc. Of course a control is run with each test so the results in each case indicate the effectiveness of the compound.

Plants of the same size and age are divided into equal groups of controls and experimentals. The smaller and older leaves are removed from plants (only the primary leaves are used in the case of the bean plants) leaving only leaves of approximately equal size which are to be used in the experiment. These leaves are dusted lightly with Carborundum, then the leaves are inoculated by painting them lightly with a virus solution or an extract from a virus-infected plant. One hour later the experimental plants are sprayed with the test solutions which were aqueous solutions containing the chemical in the desired concentration and about 1% of a non-ionic surface active agent "Atlox 1256" reputed to be a tall oil and ethylene oxide condensation product. The plants are then kept in the greenhouse for 3 to 6 days during which time numerous discrete local lesions appear on the inoculated leaves. The lesions are counted and by comparison with the number of lesions on the control (untreated) plants, the effectiveness of the particular chemical in inhibiting the multiplication of the virus is determined.

Local lesion tests were run to extend the results obtained in the leaf disc test to whole plants. The concentrations of chemicals used and the conditions of the experiments were chosen arbitrarily and do not necessarily represent conditions for maximum effect. The results of these local lesion tests are summarized in Table II, which follows.

TABLE II

*Inhibition of local lesion production by 2-substituted-1,4,5,6-tetrahydropyrimidines*

| No. | Treatment | Molar Concentration | Percent Change in local lesion counts |
|---|---|---|---|
| TOBACCO MOSAIC VIRUS ON *N. GLUTINOSA* ||||
| 1 | 2-(8,11-Heptadecadienyl)-1,4,5,6-tetrahydropyrimidine | $10^{-4}$ M | -5 |
| 2 | 2-(8-Heptadecenyl)-1,4,5,6-tetradyhropyrimidine | $10^{-4}$ M | +5 |
| 3 | 2-(8,11-Heptadecadienyl)-1,4,5,6-tetrahydropyrimidine | $5 \times 10^{-5}$ M | -39 |
|  | 2-(8-Heptadecenyl-1,4,5,6-tetrahydropyrimidine | $5 \times 10^{-5}$ M |  |
| 4 | 2-(8-Heptadecenyl/8,11-Heptadecadienyl)-1,4,5,6-tetrahydropyrimidine mixture (from Tall Oil unsaturated fatty acids) | $10^{-4}$ / $3.3 \times 10^{-5}$ M | -35 / -17 |
| TOBACCO RINGSPOT VIRUS ON PINTO BEANS ||||
| 1 | 2-(8-Heptadecenyl/8,11-heptadecadienyl)-1,4,5,6-tetrahydropyrimidine mixture (from Tall Oil) | $6.7 \times 10^{-5}$ M | -36 |

The results (Table II) show that at $10^{-4}$ M concentration neither 2-(8,11-heptadecadienyl)- nor 2-(8-heptadecenyl)-1,4,5,6-tetrahydropyrimidine when tested alone altered the number of local lesions formed. In combination ($5 \times 10^{-5}$ M each, an equivalent concentration of the mixture), however, they caused a significant reduction in the lesion count. An equivalent concentration of the mixture derived from tall oil unsaturated fatty acids also caused a significant decrease in lesion production and this decrease was of the same magnitude as that brought about by the mechanical mixture. These results support the suggestion from the leaf disc data that a synergism is obtained from a mixture of the two derivatives.

Although few tests have been carried out with the tobacco ringspot virus (TRV) on pinto beans, the data are included to show that anti-viral activity of the tetrahydropyrimidine mixture is not limited to tobacco mosaic virus, nor is it restricted to virus attack on tobacco plants.

Thus, the data described above demonstrates the high and unexpected activity of the chemical compounds of the invention, in inhibiting the growth of plant viruses. Tobacco mosaic virus is typical of the group of viruses of the mosaic type; and tobacco ringspot virus is typical of a second group of viruses of the necrotic type. These are the two main types of virus diseases. It has been shown experimentally that both of these types of virus are controlled by the inventive method, and since viruses are quite similar chemically it would be expected that viruses generally would be controlled by the method.

Although the invention has been described in terms of specified examples which are set forth in considerable detail, it should be understood that this is by way of illustration only and that the invention is not necessarily limited thereto, since alternative embodiments will become apparent to those skilled in the art, in view of the disclosure. Particularly, it should be recognized that the claimed compounds and the salts thereof are equivalent since a salt on contact with water will hydrolyze releasing the compound itself, which is the active anti-viral agent, so actually treating the plants with the salt is in effect treating the plants with the compound itself. Accordingly, modifications are contemplated which can be made without departing from the spirit of the described invention.

What is claimed is:

1. The method of inhibiting the multiplication of plant viruses comprising applying to living plants a virus-growth inhibiting quantity of a mixture from about 5% to about 95% by weight of a pyrimidine of the formula

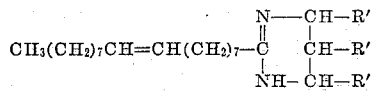

wherein R' is selected from the class consisting of hydrogen and the methyl radical with at least one R' being hydrogen and the balance of said mixture is a pyrimidine of the formula

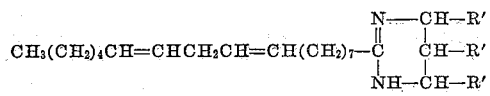

wherein R' is as defined hereinabove.

2. The method of claim 1, wherein said plants are tobacco plants and the virus is tobacco mosaic virus.

3. The method of claim 1, wherein said plants are field pinto beans and the virus tobacco ringspot virus.

4. The method of claim 1, wherein said pyrimidine is a mixture of from about 5% to about 95% by weight of 2-(8-heptadecenyl)-1,4,5,6-tetrahydropyrimidine and the balance of said mixture 2-(8,11-heptadecadienyl)-1,4,5,6-tetrahydropyrimidine.

5. The method of claim 1, wherein said pyrimidine is about an equal mixture of 2-(8-heptadecenyl/8,11-heptadecadienyl)-1,4,5,6-tetrahydropyrimidines having a boiling range of about 178° to 187° C. at 0.2 mm. of mercury pressure.

References Cited in the file of this patent
UNITED STATES PATENTS
2,649,397    Ballard                Aug. 18, 1953